United States Patent [19]

Clerc et al.

[11] Patent Number: 4,813,770
[45] Date of Patent: Mar. 21, 1989

[54] CELL WITH A DOUBLE LIQUID CRYSTAL LAYER USING THE ELECTRICALLY CONTROLLED BIREFRINGENCE EFFECT AND PROCESS FOR PRODUCING A UNIAXIAL MEDIUM WITH NEGATIVE OPTICAL ANISOTROPY USABLE IN SAID CELL

[75] Inventors: Jean-Frédéric Clerc, Saint-Egreve; Jean-Claude Deutsch, Grenoble; Aimé Perrin, Saint-Ismier, all of France

[73] Assignee: Commissariat a l'Energie Atomique, Paris, France

[21] Appl. No.: 15,717

[22] Filed: Feb. 17, 1987

[30] Foreign Application Priority Data

Feb. 28, 1986 [FR] France ................... 86 02856

[51] Int. Cl.⁴ ............................................... G02F 1/13
[52] U.S. Cl. ................................. 350/347 E; 350/335; 350/339 R
[58] Field of Search ........... 350/388, 387, 405, 347 E, 350/335, 347 R, 339 R

[56] References Cited

U.S. PATENT DOCUMENTS

| | | | |
|---|---|---|---|
| 3,838,906 | 10/1974 | Kumada | 350/387 |
| 3,923,379 | 12/1975 | Kumada | 350/387 |
| 4,190,330 | 2/1980 | Berreman | 350/347 R |
| 4,388,375 | 6/1980 | Hopper et al. | 350/337 X |
| 4,427,741 | 1/1984 | Aizawa et al. | 350/337 X |
| 4,497,542 | 2/1985 | Kaye | 350/335 |
| 4,548,479 | 10/1985 | Yeh | 350/404 |
| 4,701,028 | 10/1987 | Clerc et al. | 350/335 X |

OTHER PUBLICATIONS

Demus "Chemical Composition and Display Performance" Ed. K Metz et al. *Nonemissive Electrooptic Displays* Plenum Press pp. 83–119, New York 1976.

Billings "The Electrooptic Effect in Uniaxial Crystal of Dihydrogen Phosphate ($XH_2PO_4$) Type IV, Angular Field of the Electro-Optic Shutter" J. of the Optical Soc. of America, vol. 42, No. 1, Jan. 1952.

*Primary Examiner*—Stanley D. Miller
*Assistant Examiner*—F. Richard Gallivan
*Attorney, Agent, or Firm*—James E. Nilles; Donald C. McGaughey

[57] ABSTRACT

Cell with a double liquid crystal layer using the electrically controlled birefringence effect and process for producing a negative optical anisotropy uniaxial material usable in said cell.

The cell can comprise two crossed rectilinear polarizers, three glass plates provided with transparent electrodes and placed between said polarizers, two liquid crystal layers between the plates and, between a plate and a polarizer, a sheet of the medium, whose extraordinary axis is perpendicular to the plates. This sheet can be obtained by heating a thermoplastic polymer up to the isotropic state, under a uniform pressure on the polarizers, cooling and eliminating the pressure. The cell is designed in such a way that the molecules of the respective layers tilt in two directions forming the same angle with the homeotropy direction, when an exciting voltage is applied between the electrodes, said directions, viewed in projection on a plate, also being opposite in the main observation plane.

Application to the production of television screens.

13 Claims, 6 Drawing Sheets

CELL WITH A DOUBLE LIQUID CRYSTAL LAYER USING THE ELECTRICALLY CONTROLLED BIREFRINGENCE EFFECT AND PROCESS FOR PRODUCING A UNIAXIAL MEDIUM WITH NEGATIVE OPTICAL ANISOTROPY USABLE IN SAID CELL

BACKGROUND OF THE INVENTION

The present invention relates to a cell with a double liquid crystal layer using the electrically controlled birefringence effect and to a process for producing a uniaxial medium of negative optical anisotropy usable in said cell. It especially applies to the production of data display devices, such as matrix screens and in particular to the production of television screens.

Liquid crystal cells using the electrically controlled birefringence effect are already known. This effect has already made it possible to produce liquid crystal matrix screens and this is described in publications such as the article by J. ROBERT entitled "T.V. Image with L.C.D.", published in IEEE Transactions of Electron Devices, vol. Ed. 26, no. 8, August 1979 and the article by J.F. CLERC entitled "Electrooptical Limits of the E.C.B. Effect in Nematic Liquid Crystal", published in the journal Displays, October 1981.

A liquid crystal cell using the electrically controlled birefringence effect e.g. comprises, according to the state of the art, a nematic liquid crystal layer between two glass plates provided with transparent electrodes. Two polarizing means, e.g. two crossed rectilinear polarizers are respectively arranged on either side of the thus obtained assembly. When no voltage is applied between the electrodes, the molecules of the crystal layer are substantially parallel to a direction which is called the homeotropic direction" and perpendicular to the glass plates and incident light cannot pass through the cell. When an appropriate voltage is applied between the electrodes, the molecules of the liquid crystal layer are oriented substantially in a direction which, with the homeotropy direction, forms an angle which is a function of the voltage applied or excitation voltage. Incident light can then at least partly traverse the cell. It is therefore possible to electrically control the light intensity transmitted through said cell, said intensity being a function of said voltage.

The liquid crystal cells using the electrically controlled birefringence effect suffer from the disadvantage that the contrast of these cells, when observed obliquely, deteriorates and this increases with the observation angle and the contrast can even be reversed for certain observation angles.

French patent application No. 8407767 of May 18, 1984 proposes a liquid crystal cell using the electrically controlled birefringence effect aiming at obviating this disadvantage.

Cells of the type described in the aforementioned application can be produced with significant liquid crystal thicknesses as required for the production of complex screens (having a large number of picture elements).

However, the use of large liquid crystal thicknesses for producing the cell leads to slow molecular movements within the cell and therefore to slow optical response times on the part thereof. These times are only compatible with a rate of approximately 10 pictures per second and are consequently incompatible with an application of said cell to the production of television screens.

Moreover, the use of large liquid crystal thicknesses leads to parasitic visual effects around the image points of such a cell, the contours of said points being "white", even when the cell is in the "black" state (corresponding to a voltage between the cell electrodes below a threshold voltage).

SUMMARY OF THE INVENTION

The object of the present invention is to obviate the disadvantages consisting of the slowness of the optical response and the presence of parasitic visual effects around image points of a liquid crystal cell using the electrically controlled birefringence effect by providing two instead of one nematic liquid crystal layers in said cell.

The present invention specifically relates to a liquid crystal cell using the electrically controlled birefringence effect wherein it comprises an assembly, one of whose sides is to be exposed to the incident light and which comprises a first nematic liquid crystal layer, a first group of electrodes having at least one first and one second transparent electrodes placed on either side of the first layer, the first electrode being on said side, a second layer of said liquid crystal parallel to the first layer and separated therefrom, said second layer being placed on the side of the second electrode of the first group and a second group of electrodes with at least one first and one second electrodes placed on either side of the second layer, the first electrode of the second group being on the side of the second electrode of the first group and at least the first electrode of the second group is transparent and wherein the cell also comprises, at least on said side of the assembly which is to be exposed to the incident light, a means for polarizing the same, the molecules of the layers being substantially oriented in a homeotropic direction in the absence of a voltage between the first and second electrodes in each group, the axes of the molecules of the first layer being substantially parallel to a first axis when an excitation voltage is applied between the first and second electrodes of the first group and the axes of the molecules of the second layer are substantially parallel to a second axis when the excitation voltage is applied between the second and first electrodes of the second group.

The thicknesses of the layers can differ from one another, but they are preferably substantially equal, particularly for preventing contrast heterogeneity during observations of the cell in two directions symmetrical to one another with respect to a plane perpendicular to the main observation plane of the cell, whose definition will be given hereinafter.

Structures having two superimposed liquid crystal layers are known, but in very different fields consisting of dichroic display and ferro-electric smectic display and for solving problems differing significantly from those linked with cells utilizing the electrically controlled birefringence effect.

The use of a double liquid crystal layer for producing said cells is very advantageous.

On considering e.g. a cell according to the invention having two liquid crystal layers of the same thickness e and consequently corresponding to a prior art cell with a single layer of thickness 2e, the switching time of the cell according to the invention is four times less than that of the prior art cell, said switching time being proportional to the square of the thickness of an individual considered layer.

Moreover, the width of the aforementioned parasitic light contours is roughly proportional to the thickness of the considered individual layer and the parasitic light due to the edge effects of the point images is twice as high in the prior art cell as in the cell according to the invention.

According to a preferred embodiment of the cell according to the invention, said cell also has means for compensating the birefringence of the assembly of the two liquid crystal layers in its homeotropic structure and the cell is such that during the application of the excitation voltage, the first and second axes form the same angle with the homeotropic direction and parallel to the latter and on a plane perpendicular thereto, are respectively projected in accordance with two axes of the same direction and opposite senses, parallel to the main observation plane of the cell.

Such a cell leads to an unexpected result. This double layer cell provided with compensating means, in the case of an observation under a given angle, leads to a contrast which is much better than that obtained with a cell using the electrically controlled birefringence effect described in French patent application No. 8407767 for an equal total liquid crystal thickness, although a cell with a single layer of thickness e and not provided with compensating means, for a given observation angle, leads to a better contrast than a cell according to the invention having a total liquid crystal thickness e and not provided with compensating means.

In a particular embodiment of the cell according to the invention, the thickness equal to the sum of the thicknesses of the liquid crystal layers and each polarizing means are intended together to bring about said compensation.

In a first variant of this embodiment, the electrodes are transparent and the cell comprises first and second polarizing means located on either side of said assembly and which are equivalent to quasi-circular polarizers complementary with respect to one another with regards to an incident planar light wave propagating in the homeotropic direction, each of the first and second polarizing means also being able to give a planar light wave falling obliquely thereon in the main observation plane an elliptical polarization such that the major axis of the polarization ellipse forms an angle with the main observation plane and the sum of the thicknesses of the liquid crystal layers is equal to double the particular thickness which the assembly of the two layers must have to cancel out said angle when the obliquely falling wave has traversed said entire particular thickness.

In a second variant of this embodiment, the second electrode of the second group is optically reflecting, the polarizing means being able to circularly polarize an incident planar light wave propagating in the homeotropic direction and give a planar light wave obliquely falling thereon in the main observation plane an elliptical polarization such that the major axis of the polarization ellipse forms an angle with the main observation plane and the thickness equal to the sum of the thicknesses of the liquid crystal layers is such that is cancels out said angle when the obliquely falling wave has completely traversed said thickness.

In another embodiment, the compensating means comprise at least one layer of a compensating material or medium having three main optical indices, whereof one is smaller than the other two, the axis corresponding to said index being parallel to the homeotropic direction. The use of said layer of a medium for compensating the birefringence (of the two nematic liquid crystal layers in their homeotropic structure for an oblique observation of the cell) makes it possible to retain a high contrast during observations of the cell under large angles which can reach 70°.

It has also been found that the cell proposed in French patent application No. 8407767 has a number of disadvantages. Thus, it requires a given thickness of the liquid crystal layer, only permits an effective compensation of the birefringence of said layer in two planes of incidence of the light and in the vicinity of said planes and has chromaticity defects, the extinction being less satisfactory for certain light wavelengths than for others.

In this other embodiment, the cell according to the invention does not have the chromaticity defects in question, permits an effective compensation of the birefringence in the entire light incidence plane and can be realized with any liquid crystal thickness, the thickness of the compensating medium layer being obviously adjusted with a view to an optimum compensation as a function of the total liquid crystal thickness.

Moreover, the cell according to the invention and corresponding to said other embodiment, is advantageously compatible with any polarizing means (rectilinear, circular or elliptical).

Thus, according to the invention, it is possible to realize display devices not only having a considerable liquid crystal thickness and which can therefore have a high multiplexing level, but which are also achromatic, thus retaining the purity of the displayed colours and the stability of said colours when obliquely observed.

The cell according to the invention corresponding to said other embodiment can have transparent electrodes and two complementary polarizing means on either side of said assembly, each compensating material layer being located between one of the polarizing means and said assembly.

The term "polarizing means complementary of one another" is e.g. understood to refer to two crossed rectilinear polarizers, or two circular or elliptical polarizers which are complementary of one another with respect to an incident planar light wave propagating in the homeotropic direction or to the left and right with respect to said wave respectively.

In a particular realization, the two complementary polarizing means are crossed rectilinear polarizers and the compensating medium is a uniaxial medium of negative optical anisotropy having an axis of symmetry parallel to the homeotropic direction and an extraordinary axis parallel to said axis of symmetry.

In another practical realization, the two complementary polarizing means are complementary circular polarizers and the compensating medium is a uniaxial medium of negative optical anisotropy having an axis of symmetry parallel to the homeotropic direction and an extraordinary axis parallel to said axis of symmetry.

In these two realizations, the compensating medium or material is preferably constituted by a thermoplastic polymer material. Thus, such a polymer makes it possible to produce in relatively simple manner a layer making it possible not only to compensate the birefringence, but also to bond to one another two components of the cell between which it is located.

In another realization, the two complementary polarizing means are crossed rectilinear polarizers and the compensating medium is a biaxial medium, whereof the weakest index axis is parallel to the homeotropic direction.

Preferably, the product of the thickness of each layer of said medium by the absolute value of the difference between the two other main indices of said medium is approximately 0.125 micrometre, which enables said layer to constitute in the visible range a quasi-quarter wave delay plate.

In a special embodiment of a cell according to the invention, which is realized in accordance with said other embodiment and has two complementary polarizing means and whereof the electrodes are transparent, the cell also comprises an optically reflecting layer placed at one end of the cell, on the side opposite to that which is to be exposed to incident light.

The present invention also relates to a process for producing a layer of a uniaxial material having a negative optical anisotropy with an axis of symmetry perpendicular to said layer and an extraordinary axis parallel to said axis of symmetry, wherein it comprises the successive stages of subjecting each side of a single or multiple layer of a thermoplastic polymer material, which is kept flat, to a uniform pressure, heating the layer maintained in this pressure state until it passes from its vitreous phase into its isotropic phase, stopping heating and eliminating the pressure.

This process makes it possible to relatively simply obtain said layer of a negative optical anistropy uniaxial material, which can be used in certain realizations of the cell according to the invention. This uniaxial material layer can be kept flat by means of two planar, transparent, rigid substrates, between which it is placed.

BRIEF DESCRIPTION OF THE DRAWINGS

The invention is described in greater detail hereinafter relative to non-limitative embodiments and relative to the attached drawings, wherein show.

DETAILED DESCRIPTION OF THE PREFERRED EMBODIMENTS

Figure 1:
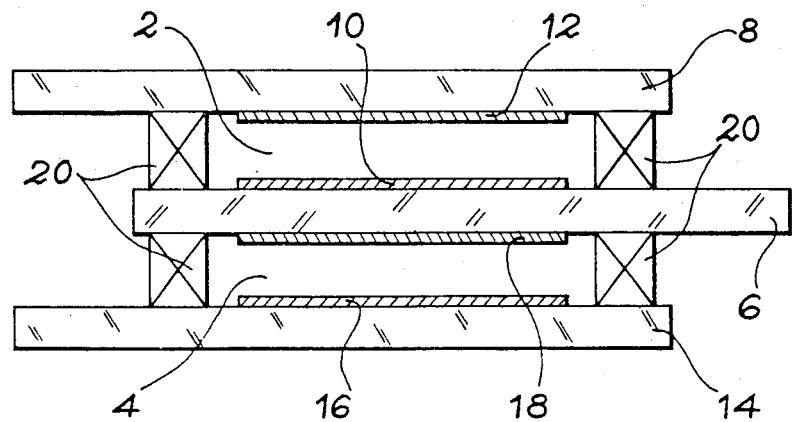
FIG. 1: A partial diagrammatic view of a cell according to the invention showing the two superimposed liquid crystal layers.

FIG. 1 diagrammatically shows an assembly common to the cells according to the invention and which are diagrammatically shown in FIGS. 5 to 9 and 13.

This assembly comprises a first layer 2 and a second layer 4 of nematic liquid crystal. The first layer 2 is placed between a first plate or central plate 6 and a second plate or upper plate 8, which are parallel and transparent and e.g. made from glass. Transparent electrodes 10, 12 are respectively disposed on the faces of plates 6, 8, which directly face one another.

The second layer 4 is located between central plate 6 and a third or lower plate 14, which is transparent (e.g. of glass) and parallel to plate 6. Transparent electrodes 16 and 18 (except for the cell of FIG. 6, for which electrode 18 is transparent and electrode 16 reflecting) are respectively placed on the faces of plates 14 and 6 directly facing one another.

Sealing means 20 are provided between plates 6, 8 and between plates 6, 14, in order to contain the corresponding liquid crystal layers between these plates.

Plate 8 can be perpendicular to plate 14, plate 6 then being displaced parallel to said plates 8 and 14, in order to permit the formation of an electrical connection between electrodes 10 and 18, to which reference will be made hereinafter.

Obviously, when a matrix screen is used, the cell comprises more than 4 electrodes and in this case it is possible to replace electrodes 10 and 18 respectively by two parallel electrode rows facing one another and corresponding to the columns of the screen, whilst electrodes 12, 16 respectively are replaced by two rows (perpendicular to the first rows) of parallel facing electrodes corresponding to the rows of the screen, an intersection of a row and a column corresponding to liquid crystal layer 2 consequently being perpendicular to a homologous intersection of a row and a column corresponding to layer 4.

Figure 2:
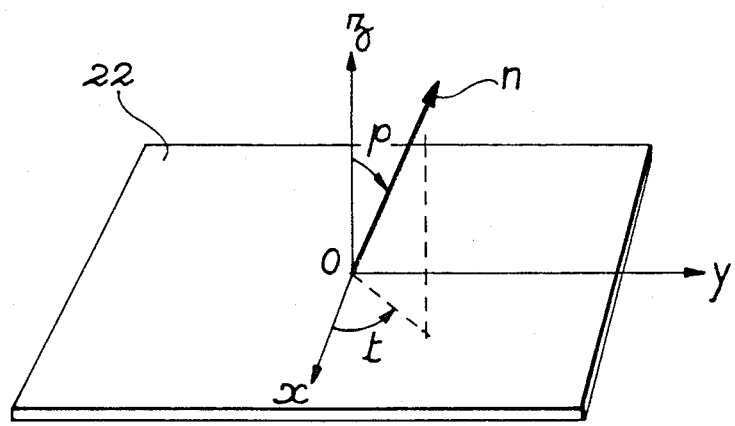
FIG. 2: The definition of the main observation plane of said cell.

FIG. 2 shows the reading screen 22 of a cell according to the invention. When incident light reaches the cell shown in FIG. 1 from the side of plate 8 thereof, screen 22 is on the side of plate 14 for a cell operating in the transmissive mode and on the side of plate 8 for a cell operating in the reflective mode. The main observation plane is perpendicular to the plane of screen 22 and corresponds to the most probable position of the reader of said screen.

It is consequently possible to define a reference 0xyz, whose centre 0 e.g. corresponds to the centre of screen 22, axis 0x corresponding to a vertical of the screen and is oriented towards the bottom thereof, axis 0y corresponds to a horizontal of the screen and is oriented to the right thereof and axis 0z is perpendicular to the screen and oriented towards a screen reader.

For a molecule of one of the liquid crystal layers, the directional axis n of said molecule can be designated by an angle p formed by said axis n with axis 0z and by an angle t which, with axis 0x, forms the projection of axis n on plane x0y parallel to axis 0z. Plane x0y is parallel to the plane of screen 22 and plane x0z corresponds to the main observation plane of the cell, the homeotropic direction being parallel to 0z.

Figure 3:
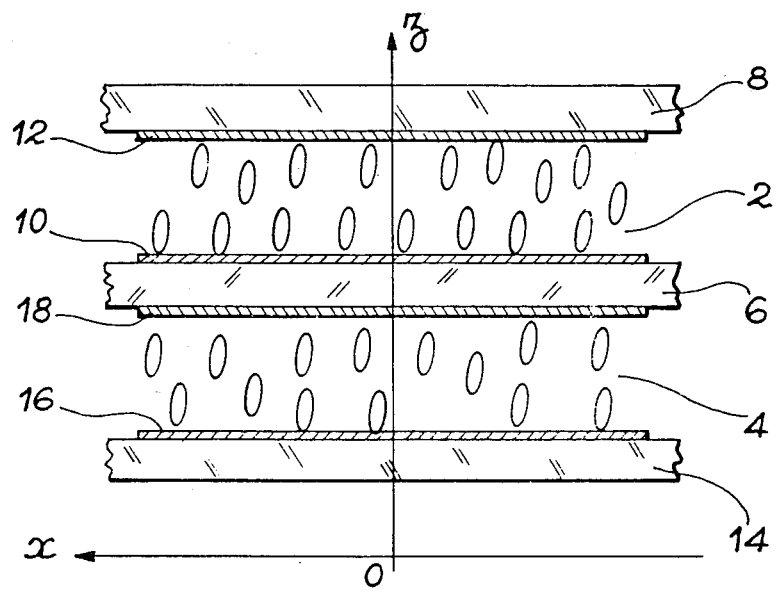
FIG. 3: The two liquid crystal layers of said cell in their homeotropic structure.

In FIG. 3, the cell described with reference to FIG. 1 is shown in its inoperative state. No voltage is applied between the electrodes of the cell. The directional axes of the molecules of layers 2 and 4 are then substantially parallel to axis 0z. In fact, as will be shown hereinafter, they are very slightly inclined with respect to said axis 0z by an angle p which can be approximately 1° to 2°.

Figure 4:
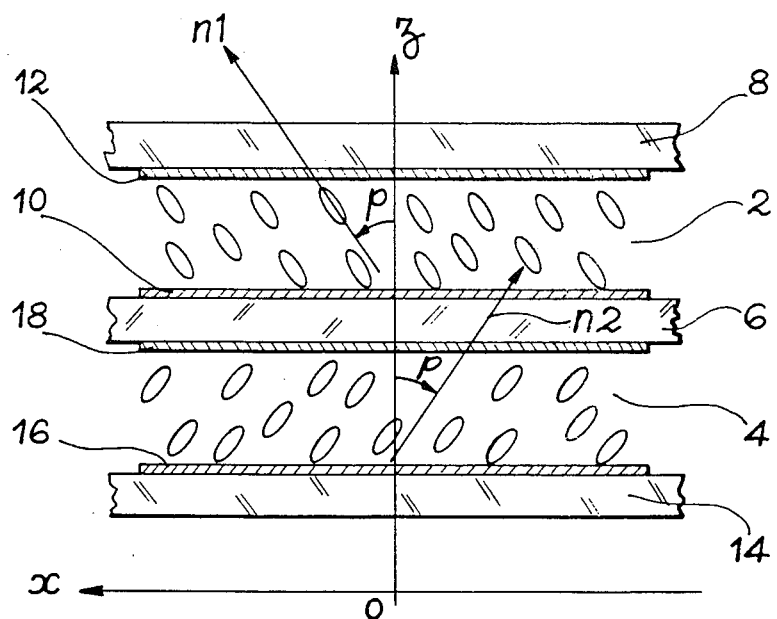
FIG. 4: The tilting of the molecules of these layers under the effect of an exciting voltage.

An electrical connection is provided between the electrodes 10 and 18 and the cell is designed so that, by applying a voltage V between electrodes 12 and 10 on the one hand and simultaneously between electrodes 16 and 18 on the other, the axes n1 of the molecules of one of the liquid crystal layers, e.g. layer 2 (FIG. 4) forms a certain angle p with axis 0z and a zero angle t with axis 0x and so that axes n2 of the molecules of the other layer (layer 4 in the example given) form an angle-p angle p with axis 0z, but an angle t equal to 180° with axis 0x. (Bearing in mind the orientation of axis 0z in FIG. 3, the cell shown therein functions in the reflective mode, but the above concept also applies for a cell according to the invention operating in the transmissive mode).

The obtaining of the same angle p for the two layers results from the application of the same voltage V between the electrodes of each layer.

The obtaining of angles t respectively equal to 0° and 180° (the angles t being independent of the voltage applied) is dependent on the very small angle by which are inclined the molecules with respect to the homeotropic direction in the absence of a voltage.

The values of 0° and 180° for the respective angles t of the layers are obtained by an appropriate preparation of plates 6, 8 and 14 by a procedure described in French patent application No. 8417794 of Nov. 22, 1984. According to this procedure, an orientation layer is deposited on each of these plates, by passing said plate into a deposition group, the plate passing in front of a target in said group, which leads to an incidence angle effect on said plate. The direction of travel of the plate imposes angle t. More precisely, the angle t=0° and t=180° are obtained by an appropriate choice of the travel direction of the corresponding plate in the deposition group.

Plates 8 and 14, which merely require the deposition of a preparation layer (on the face thereof which is to face the corresponding liquid crystal layer) have the same travel direction (first direction).

Each of the faces of plate 6 is coated with an orientation layer and successively each of the faces of said plates 6 is circulated in the orientation group in the same direction (second direction), which is the opposite to the first direction.

Figure 5:
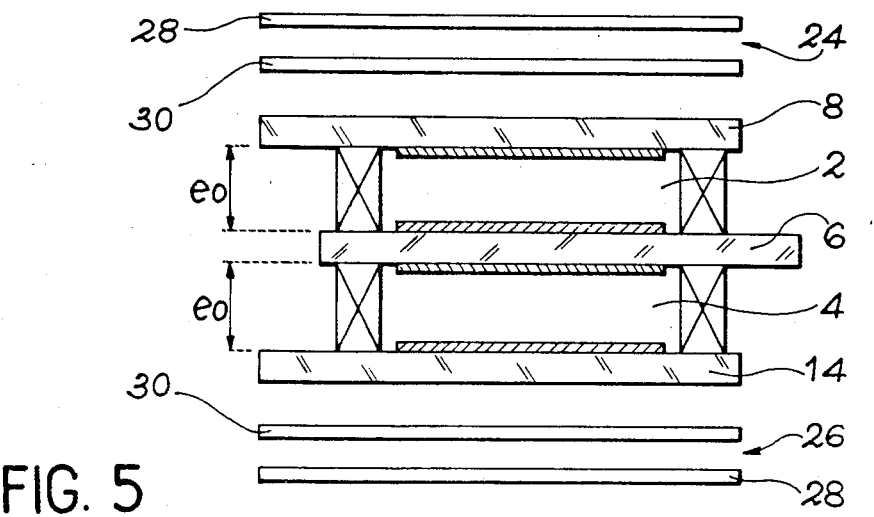
FIG. 5: A diagrammatic view of a particular embodiment of the cell according to the invention, which functions in transmission and in which the compensation of the birefringence involves the total thickness of the liquid crystal.

FIG. 5 shows diagrammatically a cell corresponding to a first embodiment of the invention. This cell functions in the transmissive mode, all its electrodes being transparent. This cell is also homologous to that shown in FIG. 4 of French patent application No. 8407767 in the sense that it essentially only differs therefrom in that it uses the two layers 2 and 4, whereas in the aforementioned application the cell only has a single liquid crystal layer.

More specifically, the cell shown in FIG. 5 comprises liquid crystal layers 2, 4 between plates 6, 8 and 14, as well as a first circular polarizer 24 and a second circular polarizer 26. which are complementary of one another and surround the assembly constituted by the plates and the layers, whilst being parallel to the plates.

The sum of the thicknesses of layers 2 and 4 is equal to twice the thickness $e_0$ referred to on p. 13 of French patent application No. 8407767. It is thus possible to give the same thickness equal to $e_0$ to each of the layers 2 and 4.

Obviously each circular polarizer 24 or 26 can be realized by means of a rectilinear polarizer 28 followed by a quarter wave plate 30 produced from a positive optical anisotropy uniaxial material, the major axis of said material being in the plane of polarizer 28 and forms an angle of 45° with the polarization direction of said polarizer 28.

Figure 6:
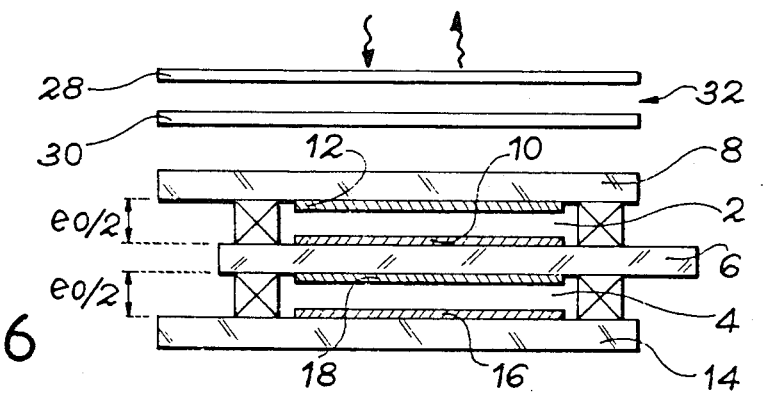
FIG. 6: A diagrammatic view of another particular embodiment functioning in reflection and in which birefringence compensation again involves the total liquid crystal thickness.

FIG. 6 diagrammatically shows a cell according to the invention corresponding to another embodiment thereof. This cell functions in the reflective mode and its electrodes 10, 12 and 18 are transparent, whereas electrode 16 is optically reflecting.

Figure 8:
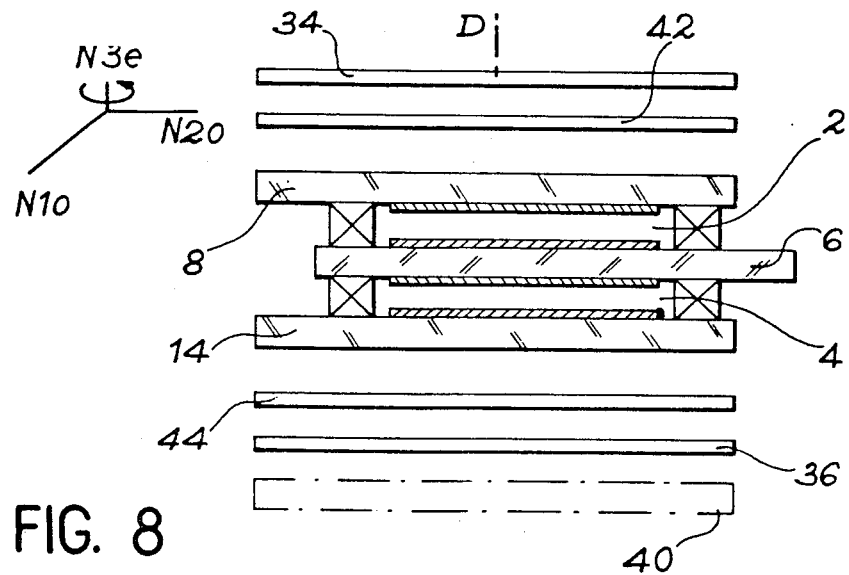
FIG. 8: A diagrammatic view of another embodiment using two plates of a biaxial material for compensating the birefringence.

This cell is the homologue of the cell shown in FIG. 8 of French patent application No. 8407767 and only differs therefrom in that it uses two liquid crystal layers 2 and 4, whereas the cell of the aforementioned application only uses a single layer.

More specifically, the cell shown in FIG. 6 comprises, other than the assembly of plates 6, 8 and 14 and layers 2 and 4, a circular polarizer 32 constituted by a rectilinear polarizer 28 followed by a quarter wave plate 30. Polarizer 32 faces plate 8 and is parallel thereto, so that incident light successively traverses polarizer 28, plate 30, layers 2 and 4 and is reflected on electrode 16; it then re-traverses the cell which is then observed through polarizer 28.

The sum of the thickness of layers 2 and 4 is equal to thickness $e_0$ (cf. p. 15 of French patent application No. 8407767), so that the thickness of each of the layers 2 and 4 is taken equal to $e_0/2$.

Figure 7:
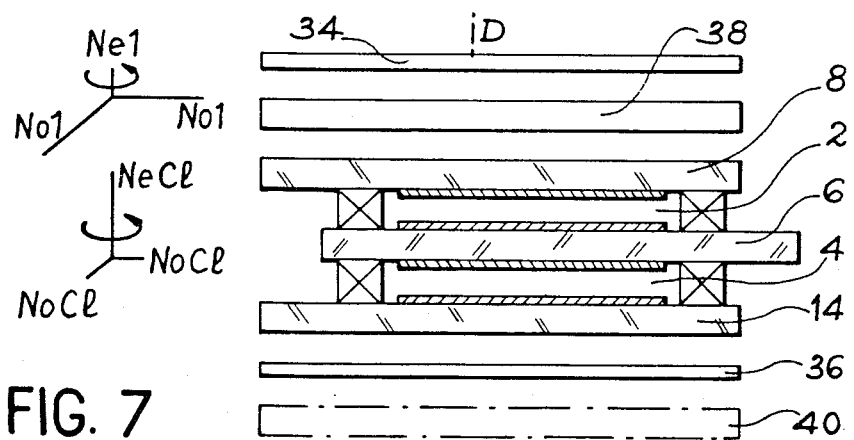
FIG. 7: A diagrammatic view of another particular embodiment using a plate of a negative optical anisotropy uniaxial medium for compensating the birefringence.

FIG. 7 diagrammatically shows a liquid crystal cell corresponding to another embodiment of the invention. This cell comprises the assembly of liquid crystal layers 2 and 4 and plates 6, 8 and 14. In addition, all the electrodes of the cell are transparent.

First and second crossed rectilinear polarizers 34 and 37 surround said assembly, the first polarizer 34 being on the side of plate 8 and the second polarizer 36 on the side of plate 14. The cell is intended to be illuminated by light falling on the first polarizer 34 and is observed through the second polarizer 36. These two polarizers are in the form of sheets parallel to the plates.

The cell also comprises a sheet or plate 38 of a compensating medium positioned between plate 8 and polarizer 34, being parallel thereto and on which information will be given hereinafter.

The aforementioned cell functions in the transmissive mode. It could function in the reflective mode by adding thereto an optically reflecting layer 40 disposed opposite to plate 14 with respect to polarizer 36 and parallel to the latter and by then observing the cell through the first polarizer 34.

The liquid crystal layers used, e.g. have the same thickness and are nematic liquid crystal layers with a negative dielectric anisotropy, whereof the molecules are essentially oriented in accordance with the homeotropy direction D, in the absence of a voltage between the electrodes. Each nematic crystal layer is also a positive optical anisotropy uniaxial material, the extraordinary index NeCl of said material exceeding its ordinary index NoCl. The ellipsoid of the indices of this material has an axis of symmetry which is the strong index axis (NeCl in the present case) and which is parallel to the major axes of the liquid crytal molecules, as well as to the homeotropy direction in the absence of a voltage between the electrodes.

The compensating sheet 38 is a negative optical anisotropy uniaxial material, the extraordinary index Nel of said material being less than its ordinary index Nol. The ellipsoid of the indices of said material have an axis of symmetry which is the weak index axis (Nel in the present case) and which is parallel to the homeotropy direction.

For information and in a non-limitative manner, each liquid crystal layer is produced from a material marketed by MERCK under the reference ZLI 1936 (with NeCl-NoCl=0.19) and has a thickness of 2.5 micrometers, whilst sheet 38 is a stack of 15 films with a thickness of 80 micrometers each made from a thermoplastic polymer marketed by Dupont de Nemours under the trademark SURLYN.

Thus, the optimum thickness of plate 38 is dependent on the total liquid crystal thickness (linear law) and the thickness of sheet 38 is experimentally determined by fixing the total thickness of the liquid crystal and by seeking the thickness of sheet 38 leading to an optimum contrast under a given observation angle. Furthermore, sheet 38 could be positioned between plate 14 and polarizer 36, instead of being positioned between plate 8 and polarizer 34.

More generally, it is possible to replace sheet 38 by a plurality of layers some being positioned between plate 8 and polarizer 34 and others between plate 14 and polarizer 36, the total thickness of these layers being equal to the given thickness for sheet 38.

FIG. 8 diagrammatically shows another embodiment of the cell according to the invention. The cell shown in FIG. 8 has the assembly of liquid crystal layers 2, 4 and glass plates 6, 8, 14 equipped with transparent electrodes, as well as two crossed rectilinear polarizers 34, 36 and optionally an optically reflecting layer 40 (for operating in the reflective mode, the cell then being illuminated by light falling on polarizer 34 and also observed through the latter), whose relative disposition has already been indicated in the description of FIG. 7.

The cell shown in FIG. 8 also has a sheet 42 located between plate 8 and polarizer 34 and a sheet 44 located between plate 14 and polarizer 36, said sheets 42 and 44 being parallel to plates 6, 8 and 14. The optical characteristics of the nematic liquid crystal layers 2 and 4 have already been indicated in the description of FIG. 7.

Each sheet 42, 44 is a biaxial medium, which has two main indices N1o and N2o with values which are close to one another and a third index N3e below N1o and N2o, the weak index axis (N3e) being parallel to the homeotropy direction.

Preferably, sheets 42 and 44 have substantially identical thicknesses and the product of the absolute value of N1o-N2o by one or other of these thicknesses is chosen so as to differ only slightly from 0.125 micrometer (condition 1) for each of the sheets 42 and 44, which then constitute in the visible range a quasi-quarter wave delay plate. This value of 0.125 micrometer corresponds to the maximum brightness of the cell shown in FIG. 8 in the "white" state corresponding to the cell under an exciting voltage.

The optimum thickness of each plate or sheet 42 or 44 (leading to an optimum contrast for an observation angle and a total liquid crystal thickness of a given nature) can be experimentally determined as a function of the total thickness chosen for the liquid crystal layers. It would also be possible to only use a single compensating sheet positioned between plate 8 and polarizer 34, or between plate 14 and polarizer 36, said single sheet then having a thickness equal to the sum of the thicknesses of sheets 42 and 44, determined as a function of the total liquid crystal thickness.

However, in the preferred embodiment referred to hereinbefore, the thickness of sheets 42 and 44 is fixed by condition 1, so that the optimum compensation of the birefringence of the liquid crystal layers is determined by choosing a constituent material for sheets 42 and 44 having an optimum extraordinary index N3e for said compensation.

In a purely indicative and non-limitative manner, each liquid crystal layer is made from the material marketed by MERCK under reference ZLI 1936 with NeCl-NoCl=0.19 and has a thickness between 2 and 3 micrometers, whilst each of the sheets 42 and 44 is made from a cellophane sheet marketed by Rhone Poulenc and which has a thickness of approximately 3.5 to 4 micrometers, the index N1o being equal to 1.660, index N2o to 1.6425 and index N3e to 1.5000.

Figure 9:
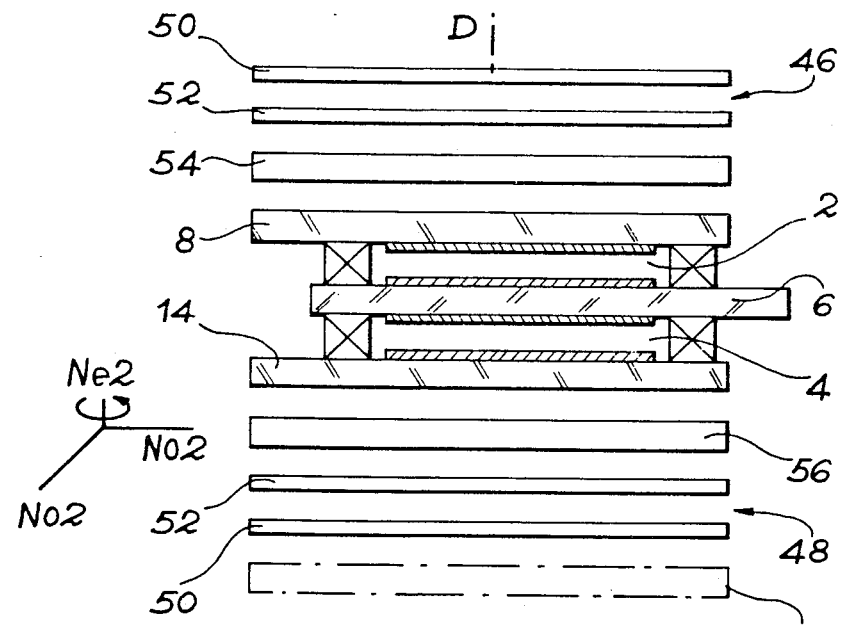
FIG. 9: A diagrammatic view of another embodiment using two plates of a uniaxial medium of negative optical anisotropy for compensating the birefringence.

FIG. 9 diagrammatically shows another embodiment of the cell according to the invention, which comprises the assembly of liquid crystal layers 2, 4 and glass plates 6, 8, 14 equipped with transparent electrodes, the arrangement of these elements having been explained relative to FIG. 7. The optical characteristics of the liquid crystal layers 2 and 4 have been given in the description of FIG. 7.

The cell shown in FIG. 9 also comprises a first circular polarizer 36 and a second circular polarizer 48, which surround the assembly. The first polarizer 46 is on the side of plate 8, so that said polarizer receives the instant light, whilst the second polarizer 48 is on the side of plate 14, said polarizers 46 and 48 being parallel to plates 6, 8 and 14 and the cell is observed through polarizer 48. Polarizers 46 and 48 are also complementary of one another, i.e. for the incident light, one of the polarizers is to the left and the other to the right.

As hereinbefore, for operating in the reflective mode, an optically reflecting layer 40 can be provided opposite to plate 14 with respect to polarizer 48, the cell then being observed through polarizer 46.

Polarizer 46 is constituted by a rectilinear polarizer 50 associated with a quarter wave plate 52 formed in a positive optical anisotropy uniaxial medium or material, the major axis of the latter being in the plane of polarizer 50 (i.e. perpendicular to the homeotropy direction) and forms with the polarization direction of said polarizer 50 an angle of 45°. In the same way, the second circular polarizer 48 is identical to the first polarizer 46 and and the quarter wave plates 52 of polarizers 46 and 48 respectively face plates 8 and 14.

The cell shown in FIG. 9 also comprises at least one sheet of a uniaxial material of negative optical anisotropy, whose optical characteristics are those of sheet 38 described relative to FIG. 7 and which is positioned parallel to plates 6, 8 and 14 between one of the latter and one of the circular polarizers. In the case of FIG. 9, the cell has two such sheets 54, 56, sheet 54 being positioned between plate 8 and polarizer 46 and sheet 56 between plate 14 and polarizer 48.

The optimum thickness (optimum contrast under a given observation angle) of the single plate 54 or 56 (or the total optimum thickness of sheets 54 and 56) is determined as a function of the total thickness of the liquid crystal. The use of one or more sheets of negative optical anisotropy uniaxial material in the cell of FIG. 9 makes it possible to separately control the almost circular ellipticity in the entire visible range of the wave passing through the liquid crystal layers (which leads to a better light efficiency in the white state of the cell) and the compensating behaviour of the system incorporating said negative optical anisotropy uniaxial material sheet and the two circular polarizers, the compensation depending on the preparation of said sheet.

Each compensating sheet used in the cell of FIG. 9 is produced in the same way as the compensating sheet used in the cell of FIG. 7 and its production (in the same way as each sheet of the cell of FIG. 7) can be integrated into the sealing stage of the cell using it, as will be shown hereinafter.

For the same total liquid crystal thickness, the thickness of the uniaxial material of negative optical anisotropy necessary for producing the cell of FIG. 9 is less than the thickness of the material necessary for producing the cell shown in FIG. 7, in view of the use in the cell of FIG. 9 of quarter wave delay plates.

In a purely indicative and non-limitative manner, the cell shown in FIG. 9 has two liquid crystal layers of thickness 2.5 micrometers each made from the material marketed by MERCK under reference ZLI 1936 with NeCl-NoCl=0.19, each circular polarizer is of the type marketed by POLAROID under reference HCP 37 and each of the sheets 54 and 56 is constituted by a stack of 5 films of the material marketed by Dupont de Nemours under reference SURLYN, each film having a thickness of 80 micrometers.

A description will now be given of the interest of using a cell with two layers, which tilt or swing in opposite directions, associated with means for compensating the birefringence of the liquid crystal. For this purpose, a study will be made of the variations of a relative intensity I/Io as a function of an angle a for a cell according to the invention, e.g. functioning in the transmissive mode, Io being the intensity of the incident light and I the intensity of the light obtained after passing through the cell under an exciting voltage, angle a being an angle formed between axis 0z and the observation direction.

Figure 10:
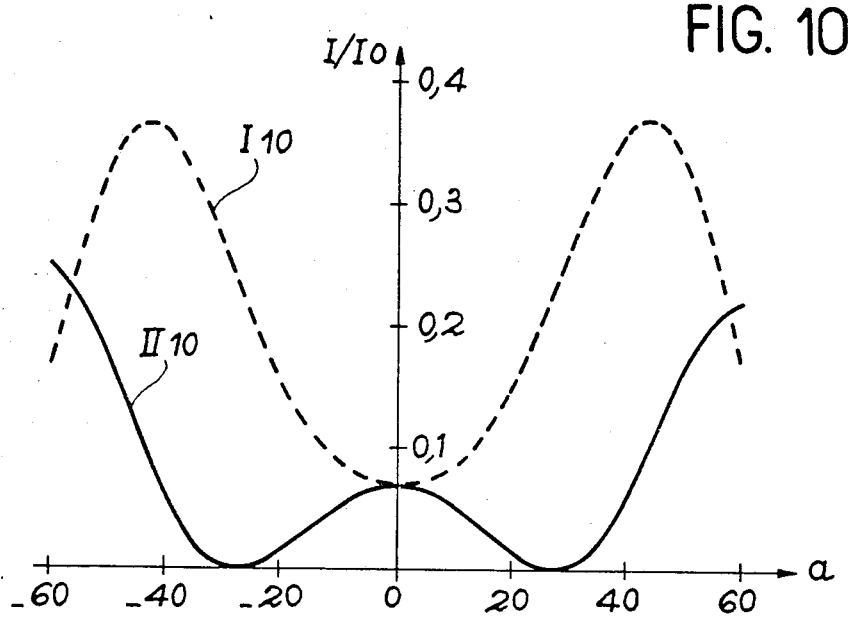
FIG. 10: The variations of the relative intensity transmitted by a cell according to the invention not provided with compensating means, as a function of the observation angle and in two perpendicular planes, one being the main observation plane of said cell.

FIG. 10 shows these variations for a cell without compensating means, e.g. of the type shown in FIG. 7, but without sheet 38. The tilt angle p of the molecules under an exciting voltage is equal to 20°. Variations are represented for an observation, whose direction is in plane x0z (curve I10) and for an observation direction in plane y0z (curve II10).

Figure 11:
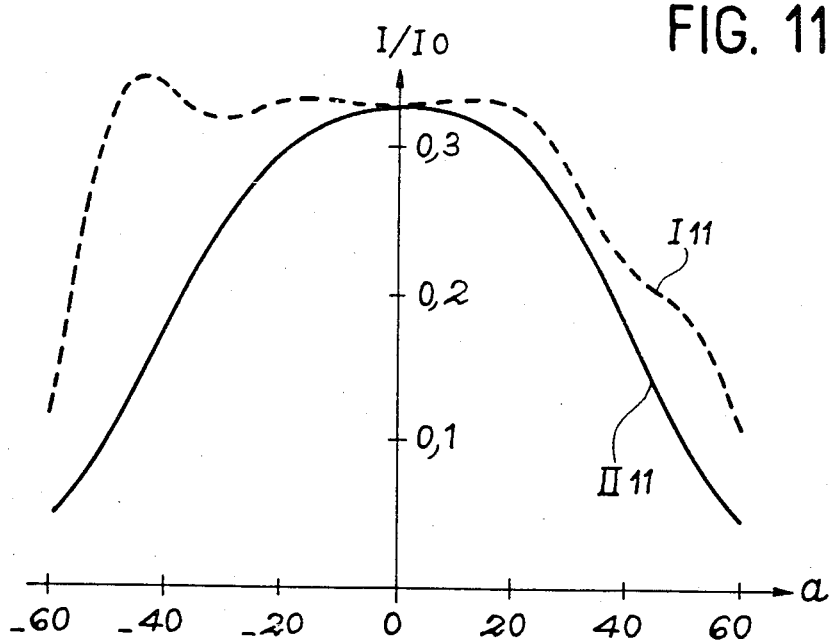
FIG. 11: The same variations when the cell is equipped with compensating means.

In FIG. 11, said variations are represented for a cell of the type shown in FIG. 7, for which the tilt angle p of the molecules under an exciting voltage is equal to 30°, said variations also being studied for an observation direction in plane x0z (curve I11) and for an observation direction in plane y0z (curve II11).

This reveals the superiority of the cell having two layers tilting in opposite directions and which is provided with compensating means, as compared with a cell not having such means. For the cell equipped with compensating means, the stability of the white state under incidence is remarkable and the curves of FIG. 11 have no singular point corresponding to observation direction.

Figure 12:
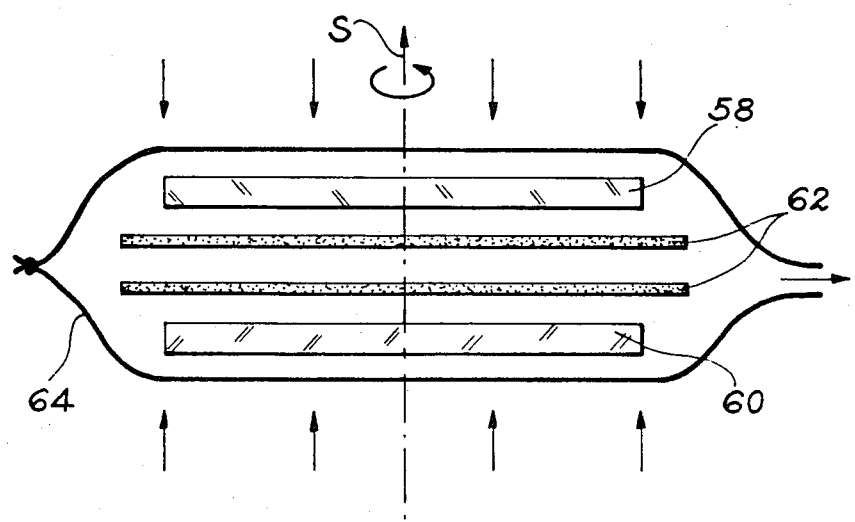
FIG. 12: Diagrammatically an embodiment of the process according to the invention permitting the production of a negative optical anisotropy uniaxial material layer usable in the present invention.

FIG. 12 diagrammatically illustrates a process for producing a layer of negative optical anisotropy uniaxial material having an axis of symmetry perpendicular to said layer, the weakest index axis of the layer being parallel to said axis of symmetry. Such a layer can be used in the production of the cells shown in FIGS. 7 and 9.

The process involves placing between two rigid, planar, transparent substrates 58 and 60, one or more sheets 62 of a thermoplastic material, e.g. that marketed by Dupont de Nemours under the mark SURLYN. At ambient temperature, such a material is in the vitreous state, but has a birefringence dependent on its past history. By heating to an appropriate temperature, the material passes from the vitreous state into the isotropic state, in which it no longer has refringence. Substrates 58 and 60 are e.g. two glass plates like plates 6, 8 and 14 used in the cell described in connection with FIG. 7.

With the sheet or sheets placed between the substrates, a uniform pressure is applied to each of the substrates (normal thereto). For this purpose, it is possible to introduce the assembly constituted by the sheet or sheets and the substrates into a plastic bag 64, which can be placed in an oven for the reason indicated hereinafter, after which a vacuum is formed in the bag, which is thermally sealed. A uniform pressure equal to atmospheric pressure is then applied to each substrate.

This is followed by the heating of the bag containing the assembly in question, e.g. in an oven until the thermoplastic material reaches its transition temperature between the vitreous state and the isotropic state, after which the bag is removed from the oven and is opened.

The material cools and then retracts. This retraction can only take place in a single direction perpendicular to the two substrates. Thus, an axis of symmetry S perpendicular to said direction appears in this material which, on reassuming its vitreous state, returns to the birefringence state. Thus, a negative optical anisotropy uniaxial material layer is obtained, which has an axis of symmetry perpendicular to said layer and which carries the extraordinary axis of the material.

The process described hereinbefore relative to FIG. 12 is directly integrated in an advantageous manner into a process for the production of a liquid crystal cell according to the invention and more specifically into the stage of sealing said cell, said sealing taking place hot and under pressure (prior to the introduction of the liquid crystal into the cell).

Figure 13:
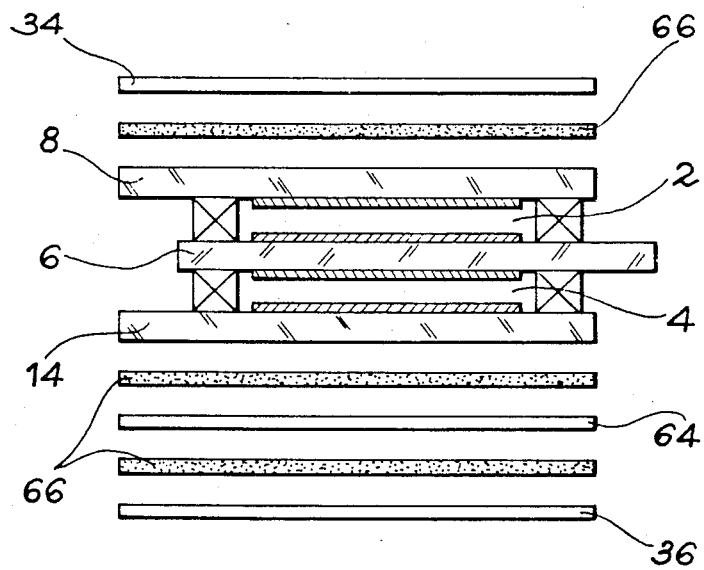
FIG. 13: A diagrammatic view of a cell according to the invention illustrating the integration of the production of several negative optical anisotropy uniaxial material layers in the sealing stage of said cell.

FIG. 13 illustrates this integration. The aim is to produce a cell according to the invention intended for colour display purposes. To this end, it is possible to produce a cell of the type shown in FIG. 7, which is also equipped with a trichrome filter 64, e.g. placed between plate 14 and polarizer 36 parallel thereto, the number and configuration of the electrodes on either side of the liquid crystal plate obviously being adapted to the filter.

The thermoplastic polymer sheet 38 shown in FIG. 7 and whose optimum thickness has been determined is replaced in the case of the cell shown in FIG. 13 by three layers 66 of the same nature as sheet 38, but whereof the sum of the thicknesses is equal to that of said sheet 38. Polarizers 34 and 36 then play the same part as substrates 58 and 60 mentioned in the description of FIG. 12.

More specifically, the cell assembly shown in FIG. 13 is introduced into a plastic bag, the vacuum is formed in the bag and the latter is placed in an oven. After the thermoplastic material reaches its transition temperature (known for a given material), the bag is removed from the oven and opened. As hereinbefore, during the following cooling, each layer 66 becomes a negative optical anisotropy uniaxial material layer having an axis of symmetry perpendicular to said layer and carrying the extraordinary axis of the material. Moreover, due to the heating and pressure, each layer makes it possible to bond to one another the components of the cell adjacent thereto.

In an indicative and non-limitative manner for a material of the SURLYN type, the uniform pressure applied is approximately $10^5 Pa$ to $2.10^5 Pa$ and heating takes place at a temperature at least equal to 100° C., the transition temperature of said material being approximately 90° C. Thus, an assembled cell is obtained into which the liquid crystal layers are then introduced between plates 6, 8 and 14.

Other embodiments of the cell according to the invention are possible, particularly a construction in which each cell is successively provided, from the side to be exposed to the incident light, with a circular polarizer, a sheet of a negative optical anisotropy uniaxial material and the assembly of the two layers and three plates shown in FIG. 1 and in which electrodes 10, 12 and 18 are transparent, whilst electrode 16 is optically reflecting.

What is claimed is:

1. A liquid crystal cell using the electrically controlled birefringence effect, wherein it comprises an assembly, one of whose sides is to be exposed to an incident light and which comprises a first nematic liquid crystal layer having a negative dielectric anisotropy, a first group of electrodes having at least one first and one second transparent electrode placed on either side of the first layer, the first electrode being on said one side, a second nematic liquid crystal layer having a negative dielectric anisotropy parallel to the first layer and separated therefrom, a second group of electrodes having at least one first and one second electrode, said second layer being placed on the side of the second electrode of the first group with at least one first and one second electrode of said second group placed on either side of the second layer, the first electrode of the second group being on the side of the second electrode of the first group, at least the first electrode of the second group being transparent, wherein the cell also comprises, at least on said side of the assembly which is to be exposed to the incident light, a means for polarizing said incident light, the molecules of said first and second layers being substantially oriented in a homeotropic direction in the absence of a voltage between the first and second electrodes in each group, the axes of the molecules of the first layer being substantially parallel to a first axis when an excitation voltage is applied between the first and second electrodes of the first group and the axes of the molecules of the second layer being substantially parallel to a second axis when said excitation voltage is applied between the second and first electrodes of the second group, and wherein said cell also has means for compensating the birefringence of the assembly of the first and second liquid crystal layers in its homeotropic structure so that during the application of the excitation voltage, the first and second axes form the same angle with the homeotropic direction and are respectively projected parallel to the latter and on a plane perpendicular thereto, in accordance with two axes which have the same direction and opposed orientations and which are parallel to the main observation plane of the cell.

2. A cell according to claim 1, wherein the means for compensating the birefringing of said assembly has a thickness which is equal to the sum of the thicknesses of the liquid crystal layers, and together with each polarizing means is designed so as to bring about said compensation.

3. A cell according to claim 2, wherein the electrodes are transparent and the cell comprises first and second polarizing means which are located on either side of said assembly and which are equivalent to quasi-circular polarizers complementary with respect to one another with regards to an incident planar light wave propagating in the homeotropic direction, each of the first and second polarizing means also being able to give a planar light wave falling obliquely thereon in the main observation plane an elliptical polarization such that the major axis of the polarization ellipse forms an angle with the main observation plane and wherein the sum of the thicknesses of the liquid crystal layers is equal to double the particular thickness which the assembly of said first and second layers must have to cancel out said planar light wave polarization ellipse angle when the obliquely falling planar light wave has traversed said entire particular thickness.

4. A cell according to claim 2, wherein the second electrode of the second group is optically reflecting, the poarlizing means being able to circularly polarize an incident planar light wave propagating in the homeotropic direction and give a planar light wave obliquely falling thereon in the main observation plane an elliptical polarization such that the major axis of the polarization ellipse forms an angle with the main observation plane and wherein said means for compensating the birefringence has a thickness equal to the sum of the thicknesses of the liquid crystal layers such that it cancels out said angle when the obliquely falling wave has completely traversed said thickness.

5. A cell according to claim 1, wherein the means for compensating the birefringence comprises at least one layer of a compensating medium having three main optical indices, and wherein one of said main optical indices is weaker than the other two, with the axis corresponding to said one index being parallel to the homeotropic direction.

6. A cell according to claim 5, wherein the electrodes are transparent, wherein the cell comprises two complementary polarizing means located on either side of said assembly and wherein each compensating medium layer is placed between one of the polarizing means and said assembly.

7. A cell according to claim 6, wherein the two polarizing means are crossed rectilinear polarizers and wherein the compensating medium is a uniaxial medium having a negative optical anisotropy, an axis of symmetry parallel to the homeotropic direction and an extraordinary axis parallel to said axis of symmetry.

8. A cell according to claim 7, wherein the compensating medium is made from a thermoplastic polymer material.

9. A cell according to claim 6, wherein the two polarizing means are complementary circular polarizers and wherein the compensating medium is a uniaxial medium having a negative optical anisotropy, an axis of symmetry parallel to the homeotropic direction and an extraordinary axis parallel to said axis of symmetry.

10. A cell according to claim 9, wherein the compensating medium is constituted by a thermoplastic polymer material.

11. A cell according to claim 6, wherein the two polarizing means are crossed rectilinear polarizers and wherein the compensating medium is a biaxial medium, whereof the weakest index axis is parallel to the homeotropic direction.

12. A cell according to claim 6 wherein it also comprises an optically reflecting layer placed at one end of the cell on the side opposite to that which is to be exposed to incident an light.

13. A cell according to claim 1, wherein the thickness of the first and second layers are substantially equal.

* * * * *